United States Patent
Brandwine (10) Patent No.: US 10,237,233 B2
(45) Date of Patent: *Mar. 19, 2019

(54) ALLOCATING IDENTIFIERS WITH MINIMAL FRAGMENTATION

(71) Applicant: Amazon Technologies, Inc., Seattle, WA (US)

(72) Inventor: Eric J. Brandwine, Haymarket, VA (US)

(73) Assignee: Amazon Technologies, Inc., Seattle, WA (US)

( * ) Notice: Subject to any disclaimer, the term of this patent is extended or adjusted under 35 U.S.C. 154(b) by 6 days.

This patent is subject to a terminal disclaimer.

(21) Appl. No.: 15/466,431

(22) Filed: Mar. 22, 2017

(65) Prior Publication Data
US 2017/0195283 A1 Jul. 6, 2017

Related U.S. Application Data

(63) Continuation of application No. 13/221,593, filed on Aug. 30, 2011, now Pat. No. 9,608,930.

(51) Int. Cl.
*G06F 15/16* (2006.01)
*H04L 29/12* (2006.01)
(Continued)

(52) U.S. Cl.
CPC ...... *H04L 61/2007* (2013.01); *H04L 43/0876* (2013.01); *H04L 47/70* (2013.01);
(Continued)

(58) Field of Classification Search
CPC .................. H04L 61/2007; H04L 61/2061
See application file for complete search history.

(56) References Cited

U.S. PATENT DOCUMENTS 6,115,545 A    9/2000  Mellquist
7,197,549 B1   3/2007  Salama et al.
(Continued)

OTHER PUBLICATIONS

Kumar et al., "The MASC/BGMP Architecture for Inter-domain Multicast Routing," ACM SIGCOMM Computer Communication Review 28(4):93-104, Oct. 1998, first disclosed at ACM SIGCOMM '98 Conference on Applications, Technologies, Architectures, and Protocols for Computer Communication, dates of conference Aug. 31-Sep. 4, 1998.

(Continued)

*Primary Examiner* — Moustafa M Meky
(74) *Attorney, Agent, or Firm* — Davis Wright Tremaine LLP (57) ABSTRACT

In certain embodiments, a system includes one or more memory units and one or more processing units. The memory units store blocks that each include a number of identifiers. The memory units include executable instructions that upon execution by the processing units cause the system to receive a request to allocate an identifier to an entity. The request includes data identifying the entity. A target block of identifiers is identified. The target block includes more unallocated identifiers than any other block. The target block is split into first and second blocks. The identifiers of the second block are each higher than any identifier of the first block. The second block is assigned to the entity, and a lowest identifier of the second block is allocated to the entity.

20 Claims, 5 Drawing Sheets

(51) Int. Cl.
*H04L 12/911* (2013.01)
*H04L 12/26* (2006.01)

(52) U.S. Cl.
CPC ........ *H04L 61/2061* (2013.01); *H04L 61/605* (2013.01); *H04L 61/6022* (2013.01); *H04L 61/6095* (2013.01)

(56) References Cited

U.S. PATENT DOCUMENTS

| | | | |
|---|---|---|---|
| 7,281,059 B2 | 10/2007 | Ryu et al. | |
| 7,286,537 B2 | 10/2007 | Roh | |
| 7,577,725 B1 | 8/2009 | Sitaraman et al. | |
| 7,702,812 B2 | 4/2010 | Wu | |
| 7,747,751 B2 | 6/2010 | Chen | |
| 7,779,093 B1 | 8/2010 | Zhang et al. | |
| 7,860,067 B2 | 12/2010 | Na et al. | |
| 7,903,678 B2 | 3/2011 | Dooley et al. | |
| 7,953,922 B2 | 5/2011 | Singh | |
| 8,005,056 B2 | 8/2011 | Park | |
| 8,279,853 B1 | 10/2012 | Breau et al. | |
| 8,886,684 B2 | 11/2014 | Kevin | |
| 9,608,930 B1 * | 3/2017 | Brandwine | H04L 47/70 |
| 2002/0040394 A1 | 4/2002 | Shapira | |
| 2002/0191562 A1 | 12/2002 | Kumaki et al. | |
| 2003/0202486 A1 | 10/2003 | Anton et al. | |
| 2005/0027834 A1 | 2/2005 | Chen et al. | |
| 2005/0097223 A1 | 5/2005 | Shen et al. | |
| 2005/0111462 A1 * | 5/2005 | Walton | H04L 47/10 370/395.4 |
| 2006/0280203 A1 * | 12/2006 | Shimokuni | H04L 1/004 370/465 |
| 2007/0136514 A1 | 6/2007 | Roth et al. | |
| 2008/0104353 A1 | 5/2008 | Madisetti | |
| 2009/0043971 A1 * | 2/2009 | Kim | G06F 17/30171 711/150 |
| 2009/0100185 A1 | 4/2009 | Sheha et al. | |
| 2009/0248897 A1 | 10/2009 | Boylan et al. | |
| 2011/0238793 A1 | 9/2011 | Bedare et al. | |
| 2013/0176983 A1 * | 7/2013 | Jung | H04W 52/365 370/329 |

OTHER PUBLICATIONS

Zappala et al., "Modeling the multicast address allocation problem," IEEE Global Telecommunications Conference 2002 (GLOBECOM'02) 3:2113-2117, Nov. 17, 2002.

* cited by examiner

ALLOCATING IDENTIFIERS WITH MINIMAL FRAGMENTATION

CROSS REFERENCE TO RELATED APPLICATIONS

This application is a continuation of U.S. patent application Ser. No. 13/221,593, filed on Aug. 30, 2011, entitled "ALLOCATING IDENTIFIERS WITH MINIMAL FRAGMENTATION," the content of which is incorporated by reference herein in its entirety.

BACKGROUND

An organization may have control over allocation of a block of Internet Protocol addresses (or other identifiers). The organization may allocate these IP addresses to various entities, such as customers of the organization. Because the computing needs of an entity may change, the quantity of IP addresses allocated to that entity by the organization may vary over time. Eventually, as addresses are allocated and deallocated across the various entities, the IP addresses may become fragmented. That is, one or more of the IP addresses allocated to a particular entity may not be contiguous with other IP addresses allocated to that entity.

DESCRIPTION OF EXAMPLE EMBODIMENTS

In certain embodiments, a request to allocate an identifier such as an Internet Protocol (IP) address is received. The request may comprise data that identifies an entity requesting allocation of the identifier. A target block of identifiers (such as a Classless Inter-Domain Routing (CIDR) block) from a number of blocks of identifiers may be selected. Each block may be assigned to a respective entity of a number of entities. The target block may comprise more unallocated identifiers than any of the other blocks. That is, it may be the block with the most consecutive identifiers that have not yet been allocated to an entity. The target block may be split into first and second blocks. In certain embodiments, each of the identifiers of the second block is higher than any identifier of the first block. The identifiers of the second block may be assigned to the entity and a lowest identifier of the second block may be allocated to the entity.

Figure 1:
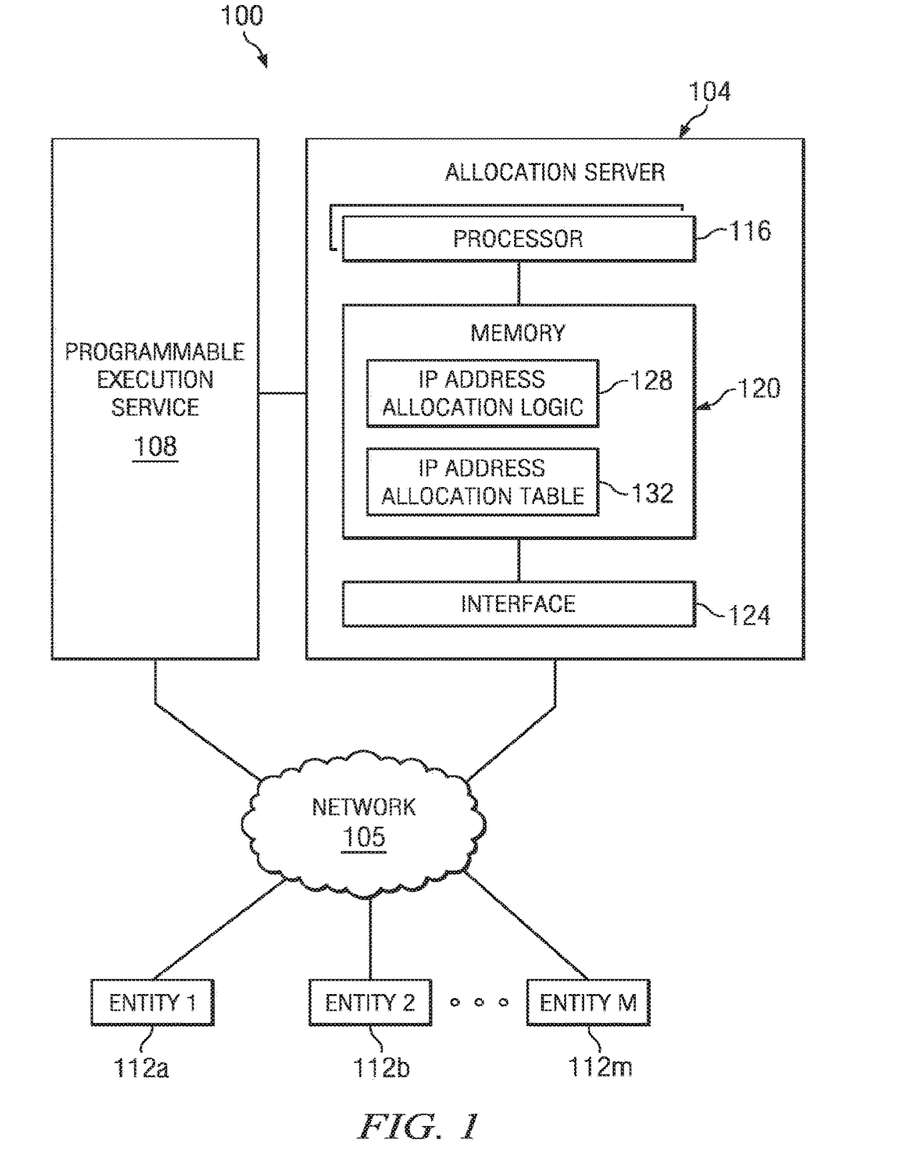
FIG. 1 illustrates an example system for allocating identifiers with minimal fragmentation.

FIG. 1 illustrates an example system 100 for allocating identifiers with minimal fragmentation. System 100 may allocate any suitable type of identifier. For example, an identifier may be any suitable network address (e.g., an IP address such as an IP version 4 (IPv4) or IP version 6 (IPv6) address), a Media Access Control (MAC) address, a telephone number, or other suitable identifier. An identifier may be expressed in any suitable manner, such as through a numeric, alphabetical, alphanumeric, or symbolic value. In some embodiments, system 100 may allocate identifiers from an identifier set. An identifier set may include a plurality of ordered identifiers. That is, the identifier set may include a lowest identifier, a second lowest identifier, and so on; and a highest identifier, a second highest identifier, and so on. As an example, an identifier set may be a block of IP addresses. In particular embodiments, system 100 may allocate network addresses, such as Internet Protocol (IP) addresses. This description will focus on examples describing the allocation of IP addresses. However, the methods and systems described herein may be used to allocate any suitable identifiers.

In the illustrated example, system 100 includes allocation server 104, network 105, programmable execution service 108, and entities 112. Allocation server 104 includes one or more processors 116, memory 120, and interface 124. Memory 120 may store IP address allocation logic 128 and IP address allocation table 132. IP address allocation table 132 may store various IP addresses that allocation server 104 may allocate to entities 112 using IP address allocation logic 128. These example elements of system 100 are described below in greater detail.

Each of allocation server 104, programmable execution service 108, and entities 112 may include one or more processing systems at one or more locations and may include any suitable combination of hardware, firmware, and software. Each processing system may include any appropriate input devices, output devices, mass storage media, processors, memory, or other suitable components for receiving, processing, storing, and communicating data. For example, each processing system may include a personal computer, workstation, network computer, kiosk, wireless data port, personal data assistant (PDA), one or more Internet Protocol (IP) telephones, one or more cellular/smart phones one or more servers, a server pool, one or more processors within these or other devices, or any other suitable processing device. Each of allocation server 104, programmable execution service 108, and entities 112 may be a stand-alone computer or may be a part of a larger network of computers associated with an entity.

Programmable execution service 108 may provide resizable computing capacity to one or more of entities 112 and may facilitate requests for allocation of IP addresses (described below in further detail). In certain embodiments, programmable execution service 108 may provide a collection of remote computing services offered over a network (which may or may not be network 105). Those computing services may include, for example, storage, compute processing, networking, power, applications, or any other suitable computing resources that may be made available over a network. In certain embodiments, an entity 112 accessing those computing services may gain access to a suite of elastic information technology (IT) infrastructure services as the entity 112 requests those services. Programmable execution service 108 may provide a scalable, reliable, and secure distributed computing infrastructure. For example, programmable execution service 108 may include various computing resources and may provide an environment in which one or more of the computing resources are made available over a communication network (e.g., network 105) to one or more remote computer systems (e.g., entities 112 or other systems).

In certain embodiments, allocation server 104 may be operable to manage the allocation and deallocation of IP addresses among entities 112a-112m. Entity 112 may be any anything capable of being assigned a group of IP addresses. For example, entity 112 may be an individual, a group of individuals, a business organization, a subunit of a business organization, a business project, a software application, one or more operating systems (e.g., a particular type of operating system), one or more computers (e.g., a particular type of computer), or other suitable unit. Assignment of a group (e.g., a block) of IP addresses to an entity 112 may comprise reserving the group of IP addresses for use by the entity 112. Allocation of an IP address to an entity 112 may comprise associating the IP address with the entity 112 and allowing the entity 112 to use the IP address. For example, an IP address may be allocated to a computing resource or other suitable processing element owned and/or used by the entity 112. In some embodiments, one or more IP addresses may be allocated to one or more computing resources hosted by programmable execution service 108. For example, a web server or virtual private cloud hosted by programmable execution service 108 may be allocated one or more IP addresses. Deallocation of an IP address from an entity 112 may comprise disassociating the IP address with the entity 112 and freeing up the IP address for future allocation to the same or a different entity 112. In some embodiments, a deallocated IP address may be removed from a Domain Name System (DNS) lookup table.

In some embodiments, allocation server 104 may perform allocation of IP addresses on behalf of an organization that controls a plurality of IP addresses received from an Internet registry. As just one example, the organization could be the owner and/or operator of allocation server 104 (and/or programmable execution service 108) and the one or more entities 112 may be customers of the organization. Allocation server 104 may include one or more processors 116 and one or more memory units 120, referred to for simplicity primarily in the singular as processor 116 and memory 120. Processor 116 may include one or more microprocessors, controllers, or any other suitable computing devices or resources. Processor 116 may work, either alone or with other components of system 100, to provide a portion or all of the functionality of its associated computer system described herein. Memory 120 may take the form of any suitable combination of volatile and non-volatile memory including, without limitation, magnetic media, optical media, read-access memory (RAM), read-only memory (ROM), removable media, or any other suitable memory component.

IP address allocation logic 128 may include logic for assigning groups (e.g., blocks) of IP addresses to entities 112a-112m and allocating IP addresses to entities 112a-112m. In certain embodiments, IP address allocation logic 128 may access IP address allocation table 132 when performing the assignment and allocation of IP addresses. In some embodiments, IP address allocation logic 128 may communicate its assignments and allocation of IP addresses to IP address allocation table 132 for storage therein. In general, IP address allocation logic 128 may be effectuated by any suitable combination of hardware, software, and/or firmware.

IP address allocation table 132 may store the IP addresses that allocation server 104 may allocate to entities 112a-112m using IP address allocation logic 128. IP address allocation table 132 may also store various assignments of groups of IP addresses to entities 112a-112m and allocation of IP addresses to entities 112a-112m. IP address allocation table 132 may store the IP addresses, assignments, and allocations in any suitable data structure, such as a table. In general, IP address allocation table 132 may be effectuated by any suitable combination of hardware, software, and/or firmware.

Interface 124 may be used for the communication of signaling and/or data between allocation server 104 and one or more networks (such as network 105), programmable execution service 108 (or a component therein), and/or entities 112a-112m. For example, interface 124 may perform any formatting or translating that may be needed to allow allocation server 104 to send and receive data to and from one or more networks (such network 105), programmable execution service 108 (or a component therein), and/or entities 112a-112m over a wired or wireless connection. Interface 124 may also be used to establish any wired or wireless connections between allocation server 124 and one or more networks (such as network 105), programmable execution service 108 (or a component therein), and/or entities 112a-112m. In a particular embodiment, interface 124 may be coupled to a web server configured to receive web Application Programming Interface (API) calls from clients and/or requests for web pages that enable entities 112 to request IP addresses.

Various entities 112a-112m may request allocation of one or more IP addresses from allocation server 104. These requests may be direct or indirect requests for IP addresses. For example, a direct request may ask for a certain number of IP addresses while an indirect request may request use of one or more computing resources associated with allocation server 104 (such as one or more resources of programmable execution service 108) that utilize one or more IP addresses. In some embodiments, an indirect request by an entity 112 may result in a request by programmable execution service 108 on behalf of entity 112 for allocation of one or more IP addresses. For example, programmable execution service 108 may determine based on a request for computing resources and/or recent computing resource usage by a particular entity 112 that the entity 112 needs more IP addresses. Programmable execution service 108 may then send an appropriate request to allocation server 104. Allocation server 104 may fill these requests by allocating one or more IP addresses to each requesting entity 112 and storing the IP address assignments in IP address allocation table 132, described below.

Over time, the computing needs of the various entities 112a-112m may change. Accordingly, the entities 112a-112m may send various requests (direct or indirect) seeking allocation or deallocation of IP addresses over time. As allocation server 104 fills these requests, the IP addresses allocated to the entities 112a-112m may become fragmented. That is, the IP addresses allocated to a particular entity 112 may not be contiguous and/or aggregatable (e.g., drawn from the same CIDR block). In certain embodiments, a first IP address is contiguous with a second IP address if the binary value of the first IP address is one less or one more than the binary value of the second IP address. For example, in IP version 4 (IPv4), the IP address 0.0.0.255 is contiguous with the IP addresses 0.0.0.254 and 0.0.1.0. A CIDR block is a group of IP addresses defined by a starting (e.g., lowest) IP address and a bit-length prefix "N." The bit-length prefix N specifies the number of leading bits (starting with the leftmost bit) that are common in the binary representation of the IP addresses of the respective CIDR block. In IPv4, for example, the number of IP addresses in a CIDR block is $2^{(32-N)}$. A CIDR block is often expressed as the starting IP address, a slash, and the bit-length prefix. For example, in IPv4, a CIDR block expressed as 10.0.0.0/30 would include the IP addresses 10.0.0.0, 10.0.0.1, 10.0.0.2, and 10.0.0.3. The leading 30 (i.e., the bit-length prefix) bits of the binary representation of these IP addresses is the same. The size of a CIDR block is sometimes referred to as a/N. Thus, a single IP address in IPv4 may be referred to as a /32 and a block of 256 addresses may be referred to as a/24.

Avoiding fragmentation of the IP addresses allocated to an entity 112 across several CIDR blocks may be difficult in a dynamic environment where IP addresses are frequently allocated and deallocated in a limited address space (e.g., a set of available IP addresses). In certain embodiments, system 100 implements IP address allocation techniques designed to minimize fragmentation of IP addresses in a dynamic allocation environment. In some embodiments, allocation server 104 is operable to implement a method that minimizes fragmentation of the IP addresses it allocates to entities 112.

System 100 provides just one example of an environment in which the IP address allocation techniques of the present disclosure may be used. The present disclosure contemplates use of the IP address allocation techniques in any suitable computing environment. Additionally, although functionality is described as being performed by certain components of system 100, the present disclosure contemplates other components performing that functionality. As just one example, functionality described with reference to allocation server 104 may be performed by one or more components of programmable execution service 108. Furthermore, although certain components are illustrated as being combined or separate, the present disclosure contemplates separating and/or combining components of system 100 in any suitable manner. As just one example, allocation server 104 and programmable execution service 108 may be combined in a suitable manner.

Certain embodiments of the present disclosure may provide some, none, or all of the following technical advantages. For example, certain embodiments allocate IP addresses using techniques that minimize fragmentation of the IP addresses. The capability to express the IP addresses allocated to each entity 112 as contiguous IP addresses in as few CIDR blocks as possible may be advantageous. For example, this may enable an entity 112 to reference a relatively small set of CIDR blocks for firewall rules related to the IP addresses of the entity 112. As another example, protecting an entity 112 from denial of service (DoS) attacks may be relatively easier if the IP addresses of the entity 112 can be referenced using a small set of CIDR blocks. As another example, external parties that want to block access to a particular entity 112 may be able to block a small set of CIDR blocks that are stable, rather than several /32 s that change over time.

Figure 2:
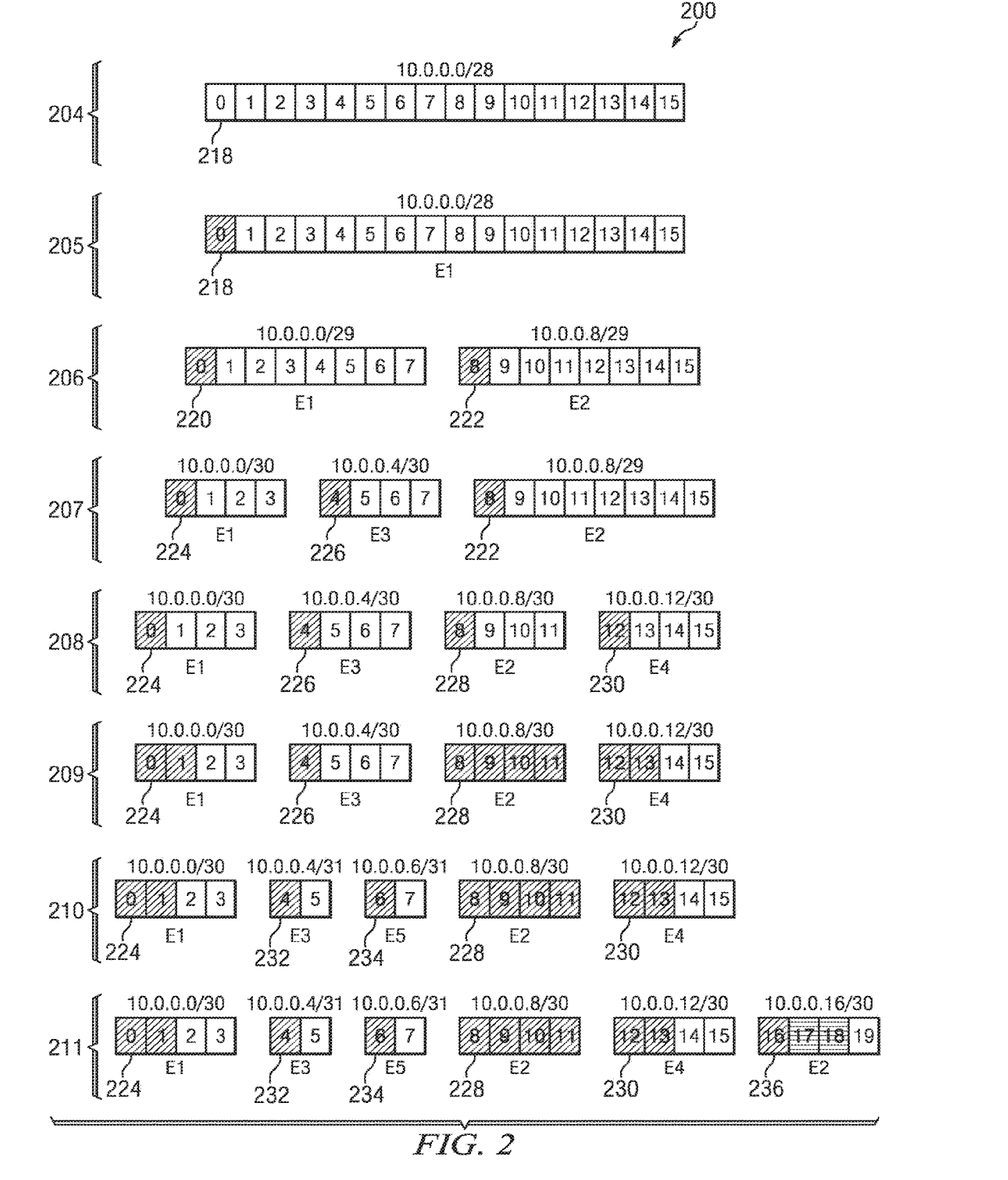
FIG. 2 illustrates an example allocation of an IP address block that may be performed by the system of FIG. 1.

FIG. 2 illustrates an example allocation of an IP address block 218 that may be performed by the system 100 of FIG. 1. Block 218 includes sixteen IP addresses (10.0.0.0 through 10.0.0.15) that are allocated among various entities E1-E5. Each of the entities E1-E5 may correspond to an entity 112 of FIG. 1. That is, each of entities E1-E5 may have functionality and/or structure similar to that of an entity 112. Sequences 204-211 each represent the state of the IP addresses of block 218 at a point in time. A state is a representation of the allocation of a group of IP addresses at a particular time. At various sequences (e.g., 206, 207, 208, and 210), block 218 may be split into smaller blocks 220, 222, 224, 226, 228, 230, 232, and 234. The example allocation of the IP addresses of FIG. 2 is described below in conjunction with the method of FIG. 3.

Figure 3:
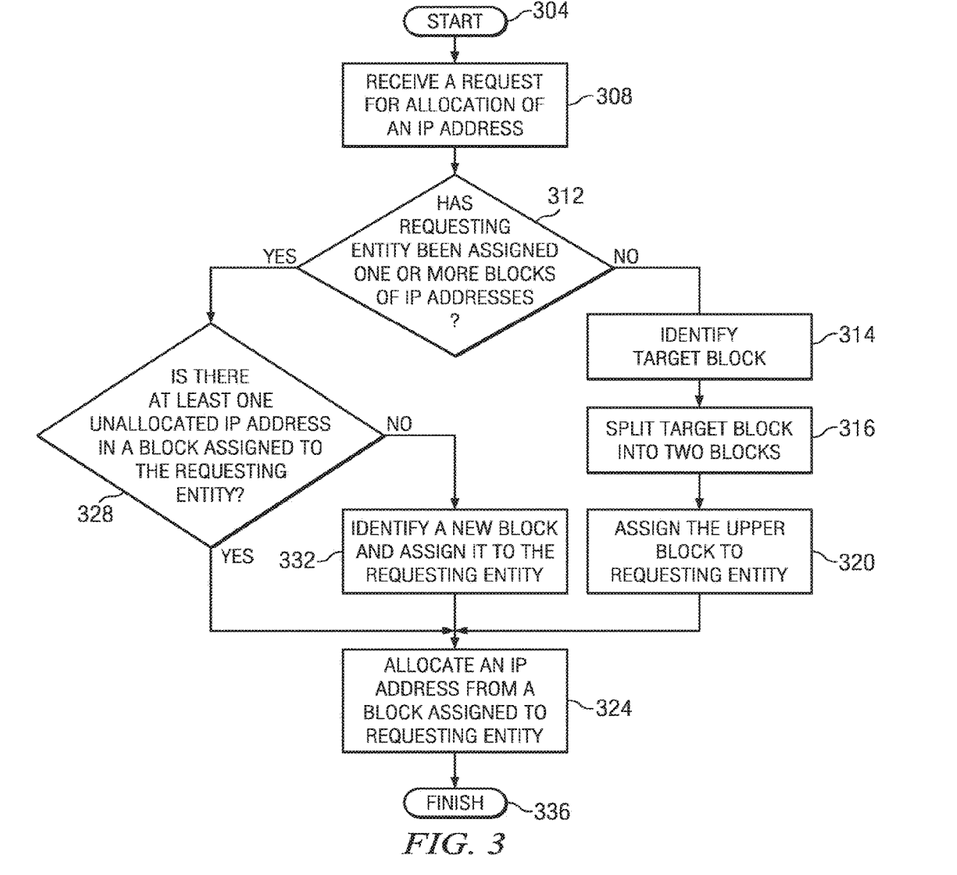
FIG. 3 illustrates an example method for allocating identifiers with minimal fragmentation that may be performed by the system of FIG. 1.

FIG. 3 illustrates an example method 300 for allocating identifiers with minimal fragmentation that may be performed by system 100 of FIG. 1 according to certain embodiments of the present disclosure. The method may be implemented in any suitable combination of software, firmware, and hardware. Although particular components may be identified as performing particular operations, the present disclosure contemplates any suitable components performing the operations according to particular needs. For purposes of this example, it will be assumed that the identifiers being allocated are network addresses, and particularly IP addresses. However, as described above, the present disclosure contemplates allocation of any suitable type of identifiers.

The method begins at operation 304. At operation 308, a request for allocation of an IP address is received. For example, allocation server 104 may receive a request for allocation of an IP address from entity 112 or programmable execution service 108. At operation 312, it is determined whether the requesting entity 112 is currently assigned one or more blocks of IP addresses. For example, IP address allocation logic 128 of allocation server 104 may access IP address allocation table 132 to determine whether the requesting entity 112 is currently assigned at least one block of IP addresses. If the requesting entity has not been assigned one or more blocks of IP addresses, the method moves to operation 314.

At operation 314, a target block is identified. For example, IP address allocation logic 128 may access IP address allocation table 132 and identify a target block of IP addresses stored therein. In some embodiments, a target block is a block derived from an initial block and that includes more contiguous unallocated IP addresses than any other block derived from the initial block. A block is derived from the initial block if the block is smaller than the initial block and all of the IP addresses of the block are also included in the initial block. In certain embodiments, a block will not be considered for the selection of a target block if over half of the IP addresses in the block have already been allocated to an entity 112.

At operation 316, the target block is split into two smaller blocks (an upper block and a lower block). For example, IP address allocation logic 128 may determine the boundaries of the upper block and lower block and communicate these boundaries to IP address allocation table 132 for storage therein. The boundaries of the two smaller blocks may be determined using any suitable method. In some embodiments, the two smaller blocks may be split along CIDR boundaries. For example, one smaller block may be a fraction of the size of the target block, where the denominator of the fraction is a power of two, and the other smaller block may comprise the remainder of the target block. In some embodiments, at least one of the smaller blocks may be expressed as a single CIDR block. In some embodiments, the two smaller blocks may have an equal size (i.e., they may each have the same number of IP addresses). In some embodiments, the sizes of the two smaller blocks may be determined using a heuristic method. For example, the sizes of the two smaller blocks may be determined according to one or more parameters, such as a past IP address usage history of one or both of the entities to which the smaller blocks are being assigned, the number of blocks and/or IP addresses available for assignment and/or allocation, information included in the request for allocation of the IP address (e.g., a request to reserve a particular number of IP addresses for the entity), or any other suitable parameter or combination of parameters.

In some embodiments, each smaller block includes a set of contiguous IP addresses. The IP addresses of the lower block are each lower than any address of the upper block. A first IP address is lower than a second IP address if the binary value of the first IP address is less than the binary value of the second IP address. Similarly, a first IP address is higher than a second IP address if the binary value of the first IP address is greater than the binary value of the second IP address. As an example, IP address 0.0.1.0 is lower than 0.1.0.0 and higher than 0.0.0.1.

At operation 320, the upper block of the split blocks is assigned to the requesting entity 112 and the lower block is assigned to the same entity 112 that the target block was previously assigned to (because it already has IP addresses allocated within the lower block). For example, IP address allocation logic 128 may assign the upper block to the particular requesting entity 112 and communicate this assignment to IP address allocation table 132 for storage therein. In some embodiments, IP address allocation logic 128 may also indicate to the IP address allocation table 132 that the lower block should be assigned to the same entity 112 that the target block was assigned to.

At operation 324, an IP address from a block assigned to the requesting entity 112 is allocated to the requesting entity 112. For example, IP address allocation logic 128 may access one or more blocks assigned to the requesting entity 112 via IP address allocation table 132, determine which IP address should be allocated to the entity 112, allocate the IP address to the entity 112, and communicate this allocation to IP address allocation table 132 for storage therein. In certain embodiments, the lowest unallocated IP address of a block assigned to the requesting entity 112 is allocated to the requesting entity 112. In some embodiments, the lowest unallocated IP address of the largest block of multiple blocks assigned to the entity 112 is allocated to the entity 112. This method of allocation may result in a fewer number of larger blocks being assigned to an entity 112, which may result in more blocks and larger blocks that are available to be split. If a request seeks allocation of multiple IP addresses, the IP addresses may each be allocated at operation 324, starting with the lowest available IP address of the appropriate block, then the next lowest available IP address of the block, and so on. If a request from an entity 112 asks for a number of IP addresses that exceeds the number of available IP addresses in the block assigned to the entity 112, a new block may be allocated to the entity 112 (described in more detail below in conjunction with operation 332). The method ends at operation 336, One or more operations of method 300 may be performed again when an additional request is received from an entity 112.

If a request for allocation of an IP address is received at operation 308 and it is determined that the requesting entity 112 has been assigned one or more blocks of IP addresses, the method moves to operation 328. For example, IP address allocation logic 128 may access IP address allocation table 132 and determine that the requesting entity 112 has already been assigned at least one IP address block. At operation 328 it is determined whether there is at least one unallocated IP address in any block assigned to the requesting entity. For example, IP address allocation logic 128 may access one or more blocks assigned to the requesting entity 112 that are stored in IP address allocation table 132 and determine whether these blocks include at least one unallocated IP address. If the requesting entity 112 does not have any unallocated IP addresses available, the method moves to operation 332, otherwise the method proceeds to operation 324.

At operation 332, a new block is identified and assigned to the requesting entity. For example, IP address allocation logic 128 may access IP address allocation table 132, identify a new block of IP addresses, assign the block to the requesting entity 112, and communicate this assignment to the IP address allocation 132 for storage therein. In certain embodiments, the new block is at least as big as the largest block (i.e., the block with the most IP addresses) assigned to the requesting entity 112. In some embodiments, the new block comes from a reserved address space that does not overlap with the initial block. A reserved address space may comprise one or more blocks that are not subject to splitting or are split only under special circumstances. For example, a block may be marked such that it cannot be split into blocks smaller than a certain size (such as a /24 CIDR block). As another example, a block may be split in order to provide a block to an entity 112 that has filled up an existing block but not to provide a block to an entity 112 that has not been assigned a block yet. In some embodiments, blocks of the reserved address space may be assigned to an entity 112 in response to a determination of a preferred block size for the entity 112. For example, a new entity 112 may request a /23 block and the block may be assigned to the new entity 112 without performance of one or more operations of method 300.

The allocation of IP addresses depicted in FIG. 2 will now be described in conjunction with the method for allocating IP addresses depicted in FIG. 3. Allocation server 104 may control allocation of the IP addresses of an initial block 218. A block of is a plurality of contiguous IP addresses. Some blocks may be CIDR blocks (each block of FIG. 2 is labeled with its CIDR denotation). For example, initial block 218 is a CIDR block expressed as 10.0.0.0/28. The numerals depicted in each box of block 218 correspond to the decimal value of the last (rightmost) octet in an IPv4 address. Thus, the box containing numeral 0 in block 218 corresponds to the address 10.0.0.0 and the box containing numeral 15 corresponds to the address 10.0.0.15.

In sequence 204, block 218 is not assigned and its constituent IP addresses are unallocated. The first entity 112 to request allocation of an IP address may be assigned the entire initial block 218. For example, E1 (i.e., entity one) requests allocation of an IP address from allocation server 104. Since E1 is the first entity 112 to request an IP address, the entire block 218 is assigned to E1. After the assignment, the lowest IP address of block 218 (10.0.0.0) is allocated to E1 (allocated blocks in FIG. 2 are depicted by diagonal shading). The result is shown in sequence 205.

Various operations of method 300 of FIG. 3 may be performed as additional requests for IP addresses are received from the various entities E1-E5. The method begins at operation 304. At operation 308, allocation server 104 receives a request for allocation of an IP address from a requesting entity 112. For example, E2 may submit a request for an IP address.

At operation 312, allocation server 104 determines whether the requesting entity 112 is currently assigned one or more blocks of IP addresses by the allocation server. In some embodiments, allocation server 104 may examine IP address allocation table 132 to determine whether the requesting entity 112 has been assigned at least one block. As an example, when E2 submits a request for an IP address, allocation server 104 may determine that E2 has not yet been assigned a block.

The method will then move to operation 314. At operation 316, a target block is identified. At operation 316, the target block is split into two smaller blocks (an upper block and a lower block). Each smaller block includes a set of contiguous IP addresses. The IP addresses of the lower block are each lower than any address of the upper block. In sequence 205, only one block exists. Accordingly, block 218 is the target block and it is split into two blocks 220 and 222. At operation 320, the upper block of the split blocks is assigned to the requesting entity 112 and the lower block is assigned to the same entity 112 that the target block was previously assigned to. As an example, block 222 is assigned to the requesting entity E2 and block 220 is assigned to E1.

At operation 324, an IP address from a block assigned to the requesting entity 112 is allocated to the requesting entity 112 by allocation server 104. As an example of operation 324, the lowest unallocated IP address (i.e., 10.0.0.8) of block 222 assigned to E2 is allocated to E2. The result is shown in sequence 206. The method ends at operation 336.

One or more operations of method 300 may be performed again when an additional request is received from an entity 112. For example, E3 may request allocation of an IP address and the request is received by allocation server 104 at operation 308. At operation 312, allocation server determines that there are no blocks assigned to E3. At operation 316, the existing blocks 220 and 222 are examined to determine a target block with the most contiguous unallocated IP addresses. Because blocks 220 and 222 each have seven unallocated IP addresses, either block may be chosen. Block 220 is chosen and split into lower block 224 and upper block 226. At operation 320, lower block 224 is assigned to E1 and upper block 226 is assigned to E3. The lowest IP address of block 226 is allocated to E3 at operation 324. The result is shown in sequence 207.

Allocation server 104 then receives a request for an IP address from E4 at operation 308. At operation 312, the allocation server determines that there are no blocks assigned to E4. At operation 316, block 222 is identified as the target block because it has more contiguous unallocated IP addresses than blocks 224 and 226. Block 222 is split into two equal size blocks 228 and 230. At operation 320, block 230 is assigned to E4 and block 228 is assigned to E2. The lowest IP address of block 230 is allocated to E4 at operation 324. The result is shown in sequence 208.

After sequence 208, E1 requests one IP address, E2 requests three IP addresses, and E4 requests one IP address. In each case, at operations 312 and 328 of method 300, it will be determined that at least one block is already assigned to each respective requesting entity 112 and that each block includes at least one unallocated IP address. In each case, at operation 324, an IP address from the block assigned to the requesting entity 112 is allocated to the requesting entity 112. As depicted, the lowest unallocated IP address(es) of each block is assigned to the respective requesting entity 112. The results of the fulfillment of the requests from E1, E2, and E4 are shown in sequence 209.

Allocation server 104 then receives a request for an IP address from new entity E5 at operation 308. At operation 312, it is determined that no blocks have been assigned to E5. At operation 316, the blocks are examined to determine which block has the most contiguous unallocated IP addresses. Block 226 is identified and split into lower block 232 and upper block 234. At operation 320, block 234 is assigned to E5 and block 232 is assigned to E3. At operation 324, the lowest unallocated IP address of block 234 is allocated to E5. The result is shown in sequence 210.

Allocation server 104 then receives an additional request for allocation of an IP address from E2 at operation 308. At operation 312, it is determined that E2 has been assigned at least one block of IP addresses. At operation 328, allocation server 104 determines whether there is at least one unallocated IP address in any block assigned to the requesting entity 112. Block 228 is the only block assigned to E2 and it does not have any unallocated IP addresses available, so the method moves to operation 332.

At operation 332, a new block is identified and assigned to the requesting entity 112. As an example of operation 332, a new block 236 is assigned to the requesting entity E2. The new block 236 is from an address space that does not overlap with the initial block 218. In some embodiments, one or more of the unallocated IP addresses of the additional block may be constructively allocated (i.e., marked as allocated) when the block is assigned to the requesting entity 112. This may be done before the entity 112 requests allocation of the IP addresses. This will make the new block less likely to be chosen as a target block for splitting when a new entity 112 requests allocation of an IP address. As an example, one of the addresses of block 236 may be allocated to E2 and two of the addresses may be constructively allocated (depicted by horizontal shading). The result is shown in sequence 211. After sequence 211, if a request for an IP address is received from a new entity 112, block 236 will not be chosen for splitting even though it has the highest number of actual unallocated blocks because it will be treated as having only one unallocated block.

Figure 4:
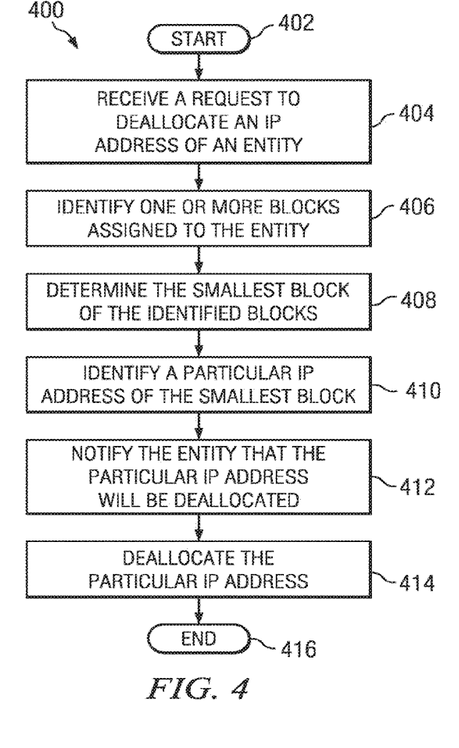
FIG. 4 illustrates an example method for deallocating identifiers that may be performed by the system of FIG. 1.

FIG. 4 illustrates an example method 400 for deallocating identifiers that may be performed by system 100 of FIG. 1. Although any suitable identifier may be deallocated, the following example will focus on IP addresses. At operation 402, the method begins. At operation 404, a request to deallocate an IP address that is allocated to entity 112 is received by allocation server 104. In some embodiments, entity 112 may send the request to allocation server 104. In other embodiments, entity 112 may send a request to programmable execution service 108 seeking a drop in computing capacity. Programmable execution service 108 may use information from such a request and/or recent computing resource usage of entity 112 to determine that entity 112 can operate with less IP addresses than are currently allocated to the entity 112. Accordingly, programmable execution service 108 may send a request on behalf of entity 112 to deallocate one or more IP addresses allocated to the entity 112.

At operation 406, one or more blocks of IP addresses assigned to entity 112 are identified. At operation 408, allocation server 104 determines the smallest block (i.e., the block with the least amount of IP addresses) of the one or more blocks of IP addresses assigned to entity 112. At operation 410, a particular IP address of the smallest block is identified. The IP address may be any suitable IP address of the smallest block. In some embodiments, the IP address is the highest allocated IP address of the smallest block. At operation 412, entity 112 is notified that the particular IP address will be deallocated. This operation gives the entity 112 time to adjust to the deallocation and/or notify third parties of the change in the IP addresses that are allocated to the entity 112 before the IP address is deallocated. At operation 414, allocation server 104 deallocates the particular IP address. If the IP address deallocated is the last allocated address in its respective block, the block is no longer assigned to entity 112 and becomes available for future assignment to an entity 112. This may result in each entity 112 being assigned a fewer number of larger blocks, thus minimizing fragmentation of the IP addresses allocated to an entity 112. The method ends at step 416.

Figure 5:
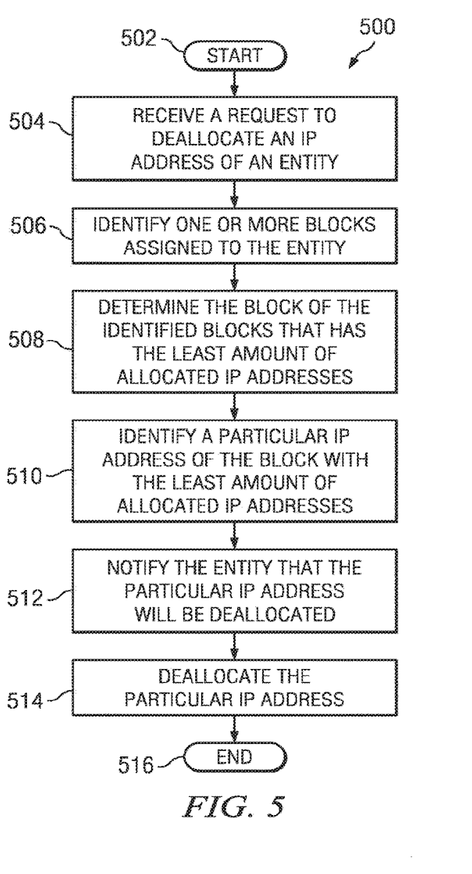
FIG. 5 illustrates an additional example method for deallocating identifiers that may be performed by the system of FIG. 1.

FIG. 5 illustrates another example method 500 for deallocating identifiers that may be performed by system 100 of FIG. 1. Operations 502, 504, and 506 correspond to operations 402, 404, and 406 of method 400. At operation 508, allocation server 104 determines the block with the least amount of allocated IP addresses of the one or more blocks of IP addresses assigned to entity 112. At operation 510, a particular IP address of the block with the least amount of allocated IP addresses is identified. The IP address may be any suitable IP address of the block with the least amount of allocated addresses. In some embodiments, the IP address is the highest allocated IP address of the block with the least amount of allocated IP addresses. Operations 512, 514, and 516 correspond to operations 412, 414, and 416 of method 400.

In certain embodiments, allocation server 104 is operable to query IP address allocation table 132 to determine a list of CIDR blocks that include all of the IP addresses allocated by allocation server 104 to a particular entity 112. In some embodiments, the list of CIDR blocks is the shortest list of CIDR blocks that include all of the IP addresses allocated to the particular entity 112 and that do not include IP addresses allocated to other entities. In some embodiments, this information may be provided through an application programming interface (API). In certain embodiments, the API is publicly available so that anyone may query for a list of CIDR blocks assigned to the particular entity 112.

In some embodiments, allocation server 104 controls the allocation of IP addresses to various entities 112 that utilize programmable execution service 108. An entity 112 may be identified by data included in a request for allocation or deallocation of one or more IP addresses. Data may indicate the identity of an entity 112 in any suitable way. For example, an entity 112 that is a customer may be identified by data comprising a customer name or customer number.

In some embodiments entities 112 are customers of a programmable execution service 108 that provides resizable compute capacity to a plurality of customers. The programmable execution service 108 and allocation server 104 may be owned and/or controlled by a vendor that is distinct from the customers of the programmable execution service. In some embodiments, an entity 112 may specify its particular computing needs to programmable execution service 108 and the programmable execution service 108 may determine how many IP addresses will be allocated to meet those computing needs. Allocation server 104 may then allocate an appropriate number of IP addresses.

Figure 6:
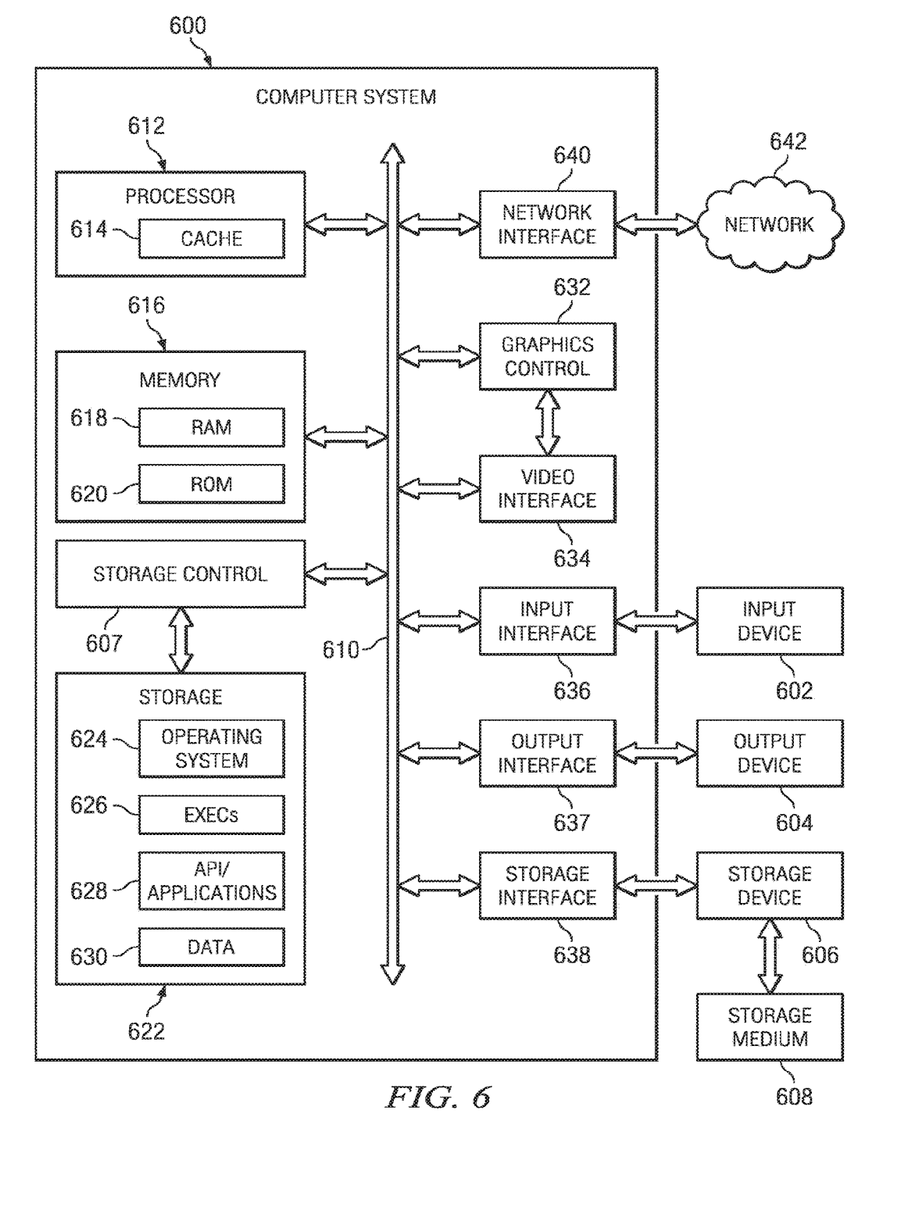
FIG. 6 illustrates an example computer system that may be used for one or more portions of the example system of FIG. 1.

FIG. 6 illustrates an example computer system 600 that may be used for one or more portions of example system 100 of FIG. 1 according to certain embodiments of the present disclosure. Although the present disclosure describes and illustrates a particular computer system 600 having particular components in a particular configuration, the present disclosure contemplates any suitable computer system having any suitable components in any suitable configuration. Moreover, computer system 600 may have take any suitable physical form, such as for example one or more integrated circuit (ICs), one or more printed circuit boards (PCBs), one or more handheld or other devices (such as mobile telephones or PDAs), one or more personal computers, one or more super computers, one or more servers, and one or more distributed computing elements. Portions or all of allocation server 104, programmable execution service 108, and entities 112 may be implemented using all of the components, or any appropriate combination of the components, of computer system 600 described below.

Computer system 600 may have one or more input devices 602 (which may include a keypad, keyboard, mouse, stylus, or other input devices), one or more output devices 604 (which may include one or more displays, one or more speakers, one or more printers, or other output devices), one or more storage devices 606, and one or more storage media 608. An input device 602 may be external or internal to computer system 600. An output device 604 may be external or internal to computer system 600. A storage device 606 may be external or internal to computer system 600. A storage medium 608 may be external or internal to computer system 600.

System bus 610 couples subsystems of computer system 600 to each other. Herein, reference to a bus encompasses one or more digital signal lines serving a common function. The present disclosure contemplates any suitable system bus 610 including any suitable bus structures (such as one or more memory buses, one or more peripheral buses, one or more a local buses, or a combination of the foregoing) having any suitable bus architectures. Example bus architectures include, but are not limited to, Industry Standard Architecture (ISA) bus, Enhanced ISA (EISA) bus, Micro Channel Architecture (MCA) bus, Video Electronics Standards Association local (VLB) bus, Peripheral Component Interconnect (PCI) bus, PCTExpress bus (PCI-X), and Accelerated Graphics Port (AGP) bus.

Computer system 600 includes one or more processors 612 (or central processing units (CPUs)). A processor 612 may contain a cache 614 for temporary local storage of instructions, data, or computer addresses. Processors 612 are coupled to one or more storage devices, including memory 616. Memory 616 may include RAM 618 and ROM 620. Data and instructions may transfer bi-directionally between processors 612 and RAM 618. Data and instructions may transfer uni-directionally to processors 612 from ROM 620. RAM 618 and ROM 620 may include any suitable computer-readable storage media.

Computer system 600 includes fixed storage 622 coupled bi-directionally to processors 612. Fixed storage 622 may be coupled to processors 612 via storage control unit 407. Fixed storage 622 may provide additional data storage capacity and may include any suitable computer-readable storage media. Fixed storage 622 may store an operating system (OS) 624, one or more executables (EXECs) 626, one or more applications or programs 628, data 630 and the like. Fixed storage 622 is typically a secondary storage medium (such as a hard disk) that is slower than primary storage. In appropriate cases, the information stored by fixed storage 622 may be incorporated as virtual memory into memory 616. In certain embodiments, fixed storage 622 may include network resources, such as one or more storage area networks (SAN) or network-attached storage (NAS).

Processors 612 may be coupled to a variety of interfaces, such as, for example, graphics control 632, video interface 634, input interface 636, output interface 437, and storage interface 638, which in turn may be respectively coupled to appropriate devices. Example input or output devices include, but are not limited to, video displays, track balls, mice, keyboards, microphones, touch-sensitive displays, transducer card readers, magnetic or paper tape readers, tablets, styli, voice or handwriting recognizers, biometrics readers, or computer systems. Network interface 640 may couple processors 612 to another computer system or to network 642. Network interface 640 may include wired, wireless, or any combination of wired and wireless components. Such components may include wired network cards, wireless network cards, radios, antennas, cables, or any other appropriate components. With network interface 640, processors 612 may receive or send information from or to network 642 in the course of performing operations of certain embodiments. Certain embodiments may execute solely on processors 612. Certain embodiments may execute on processors 612 and on one or more remote processors operating together.

In a network environment, where computer system 600 is connected to network 642, computer system 600 may communicate with other devices connected to network 642. Computer system 600 may communicate with network 642 via network interface 640. For example, computer system 600 may receive information (such as a request or a response from another device) from network 642 in the form of one or more incoming packets at network interface 640 and memory 616 may store the incoming packets for subsequent processing. Computer system 600 may send information (such as a request or a response to another device) to network 642 in the form of one or more outgoing packets from network interface 640, which memory 616 may store prior to being sent. Processors 612 may access an incoming or outgoing packet in memory 616 to process it, according to particular needs.

Certain embodiments involve one or more computer-storage products that include one or more tangible, computer-readable storage media that embody software for performing one or more operations of one or more processes described or illustrated herein. In certain embodiments, one or more portions of the media, the software, or both may be designed and manufactured specifically to perform one or more operations of one or more processes described or illustrated herein. Additionally or alternatively, one or more portions of the media, the software, or both may be generally available without design or manufacture specific to processes described or illustrated herein. Example computer-readable storage media include, but are not limited to, CDs (such as CD-ROMs), FPGAs, floppy disks, optical disks, hard disks, holographic storage devices, ICs (such as ASICs), magnetic tape, caches, PLDs, RAM devices, ROM devices, semiconductor memory devices, and other suitable computer-readable storage media. In certain embodiments, software may be machine code which a compiler may generate or one or more files containing higher-level code which a computer may execute using an interpreter.

As an example and not by way of limitation, memory 616 may include one or more tangible, computer-readable storage media embodying software and computer system 600 may provide particular functionality described or illustrated herein as a result of processors 612 executing the software. Memory 616 may store and processors 612 may execute the software. Memory 616 may read the software from the computer-readable storage media in mass storage device 616 embodying the software or from one or more other sources via network interface 640. When executing the software, processors 612 may perform one or more operations of one or more processes described or illustrated herein, which may include defining one or more data structures for storage in memory 616 and modifying one or more of the data structures as directed by one or more portions the software, according to particular needs.

In certain embodiments, the described processing and memory elements (such as processors 612 and memory 616) may be distributed across multiple devices such that the operations performed utilizing these elements may also be distributed across multiple devices. For example, software operated utilizing these elements may be run across multiple computers that contain these processing and memory elements. Other variations aside from the stated example are contemplated involving the use of distributed computing.

In addition or as an alternative, computer system 600 may provide particular functionality described or illustrated herein as a result of logic hardwired or otherwise embodied in a circuit, which may operate in place of or together with software to perform one or more operations of one or more processes described or illustrated herein. The present disclosure encompasses any suitable combination of hardware and software, according to particular needs.

Although the present disclosure describes or illustrates particular operations as occurring in a particular order, the present disclosure contemplates any suitable operations occurring in any suitable order. Moreover, the present disclosure contemplates any suitable operations being repeated one or more times in any suitable order. Although the present disclosure describes or illustrates particular operations as occurring in sequence, the present disclosure contemplates any suitable operations occurring at substantially the same time, where appropriate. Any suitable operation or sequence of operations described or illustrated herein may be interrupted, suspended, or otherwise controlled by another process, such as an operating system or kernel, where appropriate. The acts can operate in an operating system environment or as stand-alone routines occupying all or a substantial part of the system processing.

Although the present disclosure has been described with several embodiments, diverse changes, substitutions, variations, alterations, and modifications may be suggested to one skilled in the art, and it is intended that the disclosure encompass all such changes, substitutions, variations, alterations, and modifications as fall within the spirit and scope of the appended claims.

What is claimed is:

1. A computer-implemented method, comprising:
   receiving a request to allocate an Internet Protocol (IP) address for an entity;
   processing a plurality of blocks of IP addresses to determine a target block having at least as many unallocated IP addresses as any other block of the plurality of blocks;
   processing, based at least in part on information with the entity, the target block to generate a first block and a second block, the first block comprising a first subset of the IP addresses of the target block, the second block comprising a second subset of the IP addresses, the second subset comprising a non-empty remainder of the IP addresses of the target block, the numerically lowest IP address of the second block being higher than the numerically highest IP address of the first block; and
   allocating the second block to the entity.

2. The computer-implemented method of claim 1, wherein the first block is allocated to a different entity to which the target block was previously allocated.

3. The computer-implemented method of claim 1, further comprising:
   receiving a second request to allocate a second IP address to the entity;
   determining that the second block is the largest block of a plurality of blocks assigned to the entity; and
   allocating a lowest unallocated IP address of the second block to the entity.

4. The computer-implemented method of claim 1, wherein processing the target block further comprises using a heuristic method that analyzes the information to determine a size of the first block or the second block.

5. The computer-implemented method of claim 1, wherein the information is based on a usage history of the entity.

6. A system comprising:
one or more processors; and
memory that stores executable instructions that, when executed by the one or more processors, cause the one or more processors to at least:
generate, for at least a first entity requesting allocation of a network identifier, a target block of network identifiers from a plurality of blocks of network identifiers, the target block having at least as many unallocated network identifiers as any other block of the plurality of blocks;
determine a first block and a second block from the target block by at least:
determining, based on information associated with the first entity, a size for the second block;
processing the target block to generate the second block of the size, a lowest network identifier of the second block having a value higher than a lowest network identifier of the target blocks; and
allocating a remainder of the network identifiers of the target block outside of the second block to the first block; and
associate the second block with the first entity.

7. The system of claim 6, wherein the network identifiers are IP addresses.

8. The system of claim 6, wherein the first block and second block are equal in size.

9. The system of claim 6, wherein the executable instructions that, when executed, cause the one or more processors to determine the size for the second block, further cause the one or more processors to use a heuristic method to determine the size for the second block.

10. The system of claim 9, wherein the information includes a network identifier usage for the first entity.

11. The system of claim 9, wherein the information includes a quantity of network identifiers available for allocation by the system.

12. The system of claim 9, wherein the information is provided by the first entity as part of a request for the allocation.

13. The system of claim 6, wherein the executable instructions further cause the one or more processors to allocate the first block to a second entity to which at least a portion of the target block was allocated prior to a request by the first entity to allocate the network identifier.

14. One or more non-transitory computer-readable media that stores executable instructions which, when executed by one or more processors of a computer system, cause the computer system to:
receive a request to allocate a block of network identifiers to an entity;
select, based at least in part on information for the request, a target block from a plurality of blocks, the target block including at least as many unallocated network identifiers as any other block of the plurality of blocks;
determine, based at least in part on the information, a size for the second block;
generate, from the target block, the block having the determined size, a highest network identifier of the block having a value equal to a highest network identifier of the target block;
allocate the block to the entity; and
allocate at least some of a reminder of the target block outside of the block allocated to the entity to a different entity.

15. The one or more non-transitory computer-readable media of claim 14, wherein the request is received from the entity.

16. The one or more non-transitory computer-readable media of claim 14, wherein the request is associated with a different request to allocate a network identifier of the block to the entity.

17. The one or more non-transitory computer-readable media of claim 14, wherein the entity includes a computing resource hosted by a programmable execution service using the one or more processors.

18. The one or more non-transitory computer-readable media of claim 14, wherein the information includes historical access data for the entity.

19. The one or more non-transitory computer-readable media of claim 14, wherein the executable instructions, when executed, further cause the computer system to determine the size using a heuristic method.

20. The one or more non-transitory computer-readable media of claim 14, wherein the request is received via an application programming interface (API) provided by the computer system.

* * * * *